(12) United States Patent
Inazumi et al.

(10) Patent No.: US 12,515,746 B2
(45) Date of Patent: Jan. 6, 2026

(54) VEHICLE FRONT STRUCTURE

(71) Applicant: Honda Motor Co., Ltd., Tokyo (JP)

(72) Inventors: Takuya Inazumi, Tokyo (JP); Kuri Kasuya, Tokyo (JP); Heisuke Kobayashi, Saitama (JP); Kento Sakai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 18/350,771

(22) Filed: Jul. 12, 2023

(65) Prior Publication Data

US 2024/0109591 A1    Apr. 4, 2024

(30) Foreign Application Priority Data

Sep. 30, 2022 (CN) .......................... 202211205999.4

(51) Int. Cl.
*B62D 21/15* (2006.01)
*B60K 1/04* (2019.01)

(52) U.S. Cl.
CPC .............. *B62D 21/155* (2013.01); *B60K 1/04* (2013.01); *B60K 2001/0438* (2013.01)

(58) Field of Classification Search
CPC ........... B62D 21/155; B60K 1/04; B60K 5/12
See application file for complete search history.

(56) References Cited

U.S. PATENT DOCUMENTS

| 7,108,098 B2* | 9/2006 | Reese | B62D 21/11 180/291 |
| 10,988,036 B2* | 4/2021 | Park | B60L 50/66 |
| 11,603,137 B2* | 3/2023 | Eklund | B62D 21/03 |
| 11,701,958 B2* | 7/2023 | Hashida | B60K 1/04 180/68.5 |
| 12,246,772 B2* | 3/2025 | Sonobe | B62D 21/155 |

FOREIGN PATENT DOCUMENTS

| CN | 201520178 U | * | 7/2010 | |
| CN | 209634569 U | * | 11/2019 | |
| CN | 222157607 U | * | 12/2024 | |
| EP | 4524000 A1 | * | 3/2025 | B62D 21/152 |
| JP | 2020132132 | | 8/2020 | |
| WO | WO-2023112789 A1 | * | 6/2023 | B60K 1/00 |

* cited by examiner

*Primary Examiner* — Faye M Fleming
(74) *Attorney, Agent, or Firm* — JCIPRNET (57) ABSTRACT

A vehicle front structure, which can improve structural strength to protect a high voltage electrical component and improve collision safety performance, is provided. The vehicle front structure includes: a side frame, disposed on a side part of a vehicle and extending in a vehicle front-rear direction; a sub-frame, installed below the side frame and supporting a suspension component; a high voltage electrical component, disposed below a floor panel and located behind the sub-frame; a reinforcing frame, disposed around the high voltage electrical component; and a block component, disposed at a front end of the reinforcing frame. The block component has an inclined surface, and the inclined surface is inclined upward toward the sub-frame.

20 Claims, 5 Drawing Sheets

VEHICLE FRONT STRUCTURE

CROSS-REFERENCE TO RELATED APPLICATION

This application claims the priority benefit of China application serial no. 202211205999.4, filed on Sep. 30, 2022. The entirety of the above-mentioned patent application is hereby incorporated by reference herein and made a part of this specification.

BACKGROUND

Technical Field

The disclosure relates to a vehicle front structure.

Description of Related Art

In recent years, efforts to provide access to sustainable transportation systems that also take into account vulnerable persons such as the elderly or children among transportation participants are being activated. In order to achieve the above objective, research and development for further improving traffic safety or convenience are being pursued through development related to collision safety performance.

However, in the development related to the collision safety performance, the structural strength of the vehicle front structure is an issue. For example, in the prior art, in the vehicle front structure composed of structures such as a side frame, a sub-frame, and a floor panel, the reinforcing structural member may be configured to be located at the front side of a high voltage electrical component (for example, a battery module). The front surface of the reinforcing structural member forms a structure that is inclined rearward, so that the sub-frame can be guided downward when the vehicle collides. Thus, it is desirable to be able to prevent the sub-frame from directly hitting the front of the high voltage electrical component when the vehicle collides. However, such a reinforcing structural member is generally provided as a transverse strip-shaped structure corresponding to a pair of sub-frames in the vehicle width direction and forms a hollow closed cross-sectional structure for weight reduction. In this way, the front surface of the reinforcing structural member for guiding the sub-frame is only a side surface of a part of the hollow closed cross-sectional structure. The reinforcing structural member has low structural strength and may be easily deformed when contacting the sub-frame, and it is difficult to effectively guide the sub-frame downward to prevent the sub-frame from directly hitting the front of the high voltage electrical component when the vehicle collides.

The disclosure aims at solving the above issues to improve the structural strength to protect the high voltage electrical component and to improve the collision safety performance, thereby assisting in the development of the sustainable transportation systems.

SUMMARY

The vehicle front structure of the disclosure includes: a side frame, disposed on a side part of a vehicle and extending in a vehicle front-rear direction; a sub-frame, installed below the side frame and supporting a suspension component; a high voltage electrical component, disposed below a floor panel and located behind the sub-frame; a reinforcing frame, disposed around the high voltage electrical component; and a block component, disposed at a front end of the reinforcing frame. The block component has an inclined surface, and the inclined surface is inclined upward toward the sub-frame.

DESCRIPTION OF THE EMBODIMENTS

The disclosure provides a vehicle front structure, which can improve structural strength to protect a high voltage electrical component and improve collision safety performance.

The vehicle front structure of the disclosure includes: a side frame, disposed on a side part of a vehicle and extending in a vehicle front-rear direction; a sub-frame, installed below the side frame and supporting a suspension component; a high voltage electrical component, disposed below a floor panel and located behind the sub-frame; a reinforcing frame, disposed around the high voltage electrical component; and a block component, disposed at a front end of the reinforcing frame. The block component has an inclined surface, and the inclined surface is inclined upward toward the sub-frame.

In an embodiment of the disclosure, the sub-frame has an extension portion extending rearward, and the block component is aligned with the extension portion in the vehicle front-rear direction.

In an embodiment of the disclosure, the reinforcing frame is composed of a tubular frame and is provided with a first fastening portion fastened onto the block component in a vehicle width direction.

In an embodiment of the disclosure, the inclined surface of the block component is provided with a pair of second fastening portions separately disposed in the vehicle width direction, the pair of second fastening portions protrudes further downward than the inclined surface, a pitch between the pair of second fastening portions is wider than a width of the extension portion, and the extension portion corresponds to between the pair of second fastening portions in the vehicle width direction.

In an embodiment of the disclosure, the reinforcing frame has a connection portion, an outer peripheral portion, and a front-rear extending portion, the connection portion is connected to the block component, the outer peripheral portion surrounds the high voltage electrical component, and the front-rear extending portion extends rearward from the connection portion and is connected to the outer peripheral portion.

In an embodiment of the disclosure, the connection portion extends in the vehicle width direction to be connected to the block component, and at least part of the connection portion is bent to form a bent portion.

In an embodiment of the disclosure, two outer end parts of the connection portion in a length direction form a pair of the bent portions, the connection portion further has a straight portion connected between the pair of the bent portions, and the front-rear extending portion is connected to the straight portion of an inner side of the connection portion closer to the vehicle width direction than the bent portion.

In an embodiment of the disclosure, the vehicle front structure further includes a floor frame, the floor frame is installed on the floor panel to form a closed cross-section with the floor panel and extends in the vehicle front-rear direction, and the block component is further installed on the floor frame.

Based on the above, in the vehicle front structure of the disclosure, the sub-frame is installed below the side frame, the high voltage electrical component is located behind the sub-frame, the reinforcing frame is disposed around the high voltage electrical component, and the block component is disposed at the front end of the reinforcing frame. The block component has the inclined surface, and the inclined surface is inclined upward toward the sub-frame. In this way, when the vehicle collides, the inclined surface of the block component can guide the sub-frame moving rearward and contacting the inclined surface downward, thereby restraining the sub-frame from contacting the high voltage electrical component located behind. In addition, the rear of the block component is supported by the reinforcing frame to improve the structural strength, which can restrain the block component from moving rearward when contacting the sub-frame, so that the process of the block component guiding the sub-frame downward via the inclined surface is more stable. Accordingly, the vehicle front structure of the disclosure can improve the structural strength to protect the high voltage electrical component and improve the collision safety performance.

Figure 1:
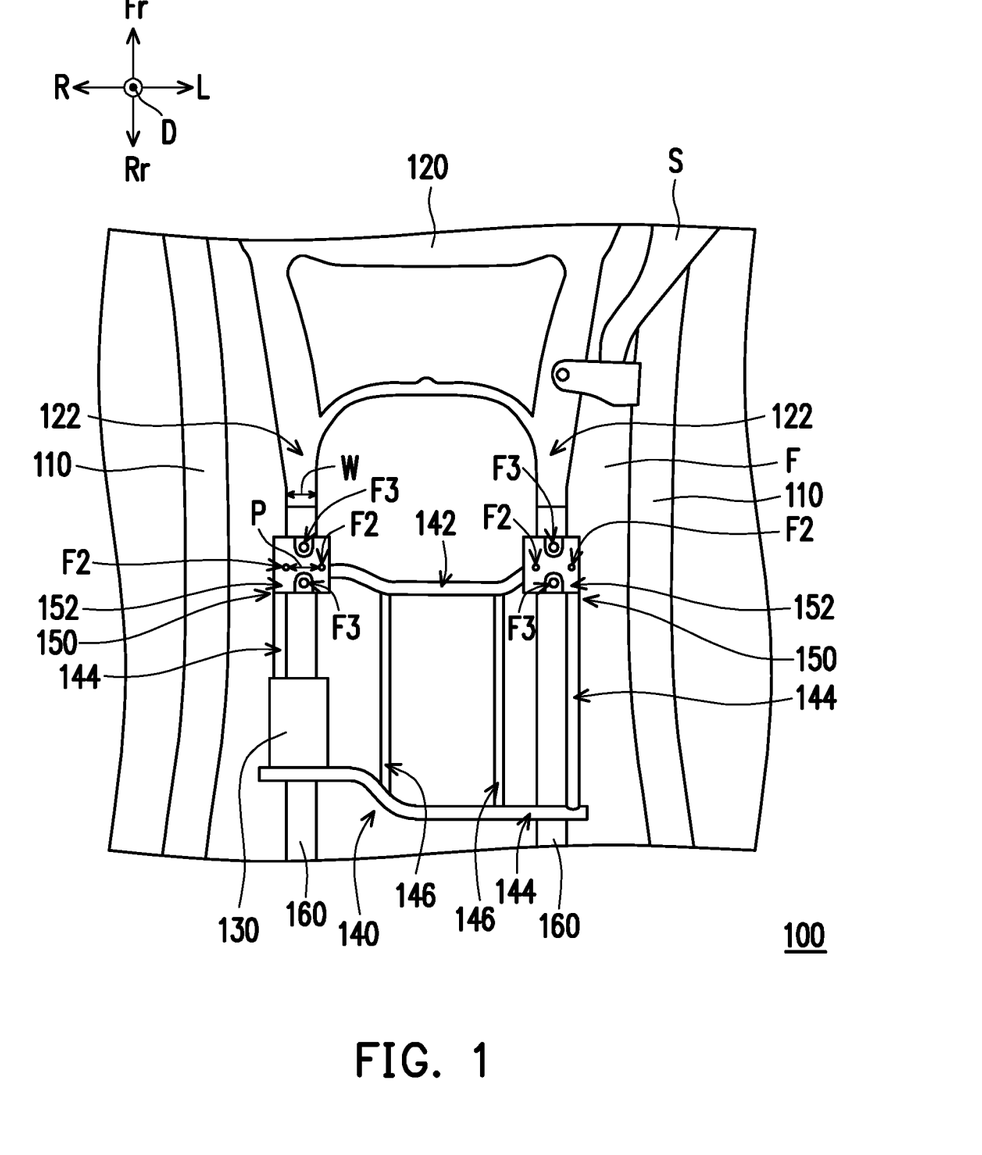
FIG. 1 is a schematic bottom view of a vehicle front structure viewed from below to above according to an embodiment of the disclosure.
Figure 2:
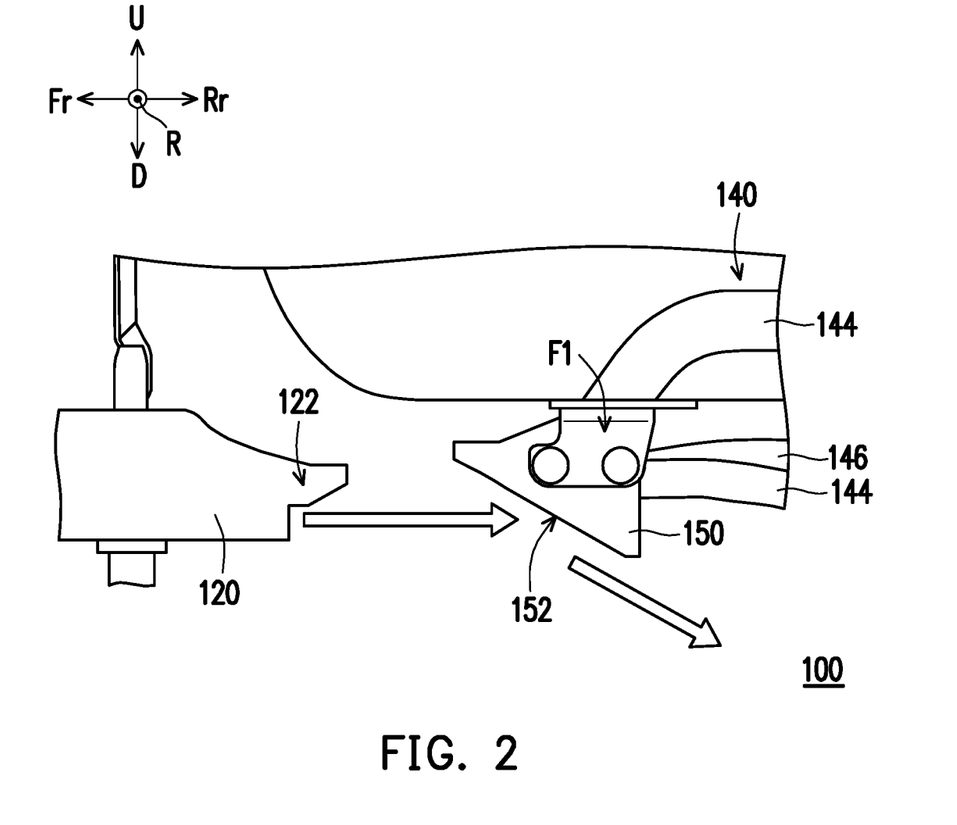
FIG. 2 is a schematic partial side view of the vehicle front structure shown in FIG. 1.
Figure 3:
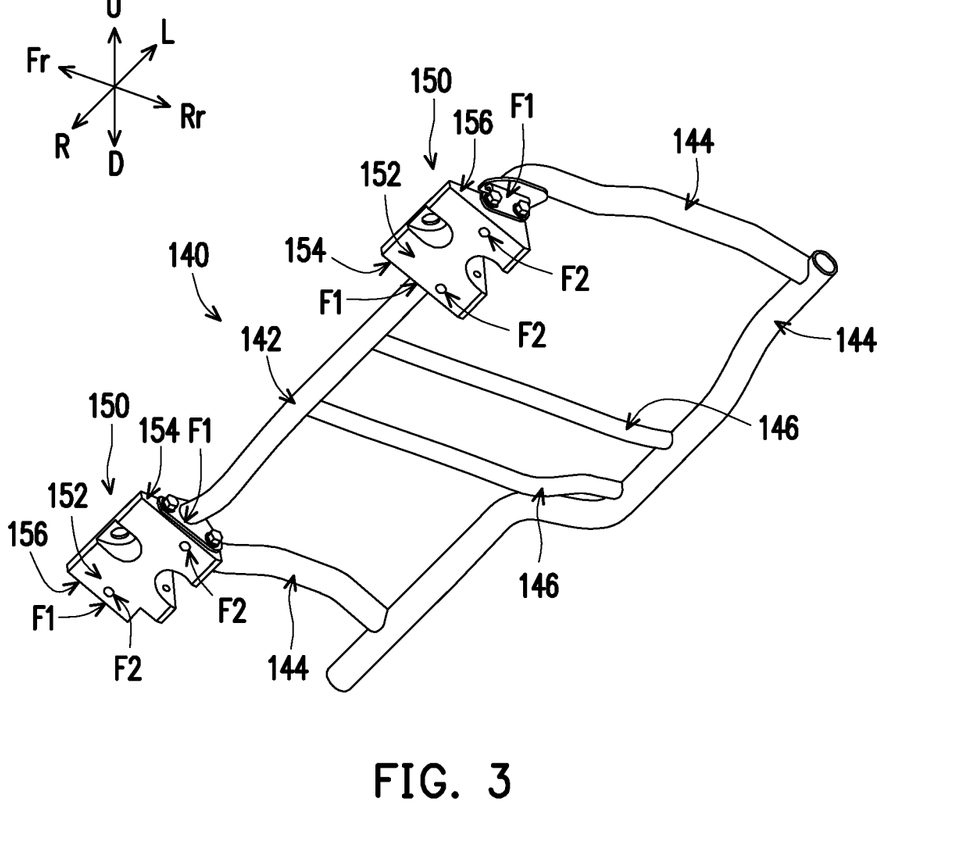
FIG. 3 is a schematic three-dimensional view of a reinforcing frame and a block component used in the vehicle front structure shown in FIG. 1.
Figure 4:
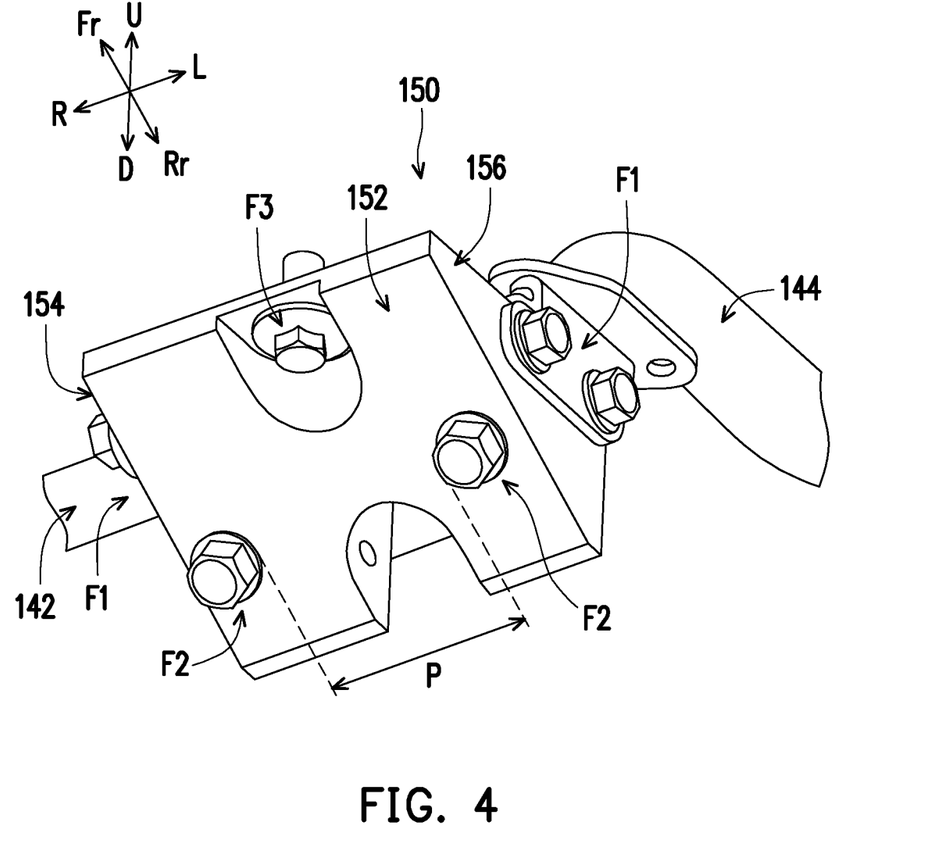
FIG. 4 is a schematic partially enlarged view of the vehicle front structure shown in FIG. 3.
Figure 5:
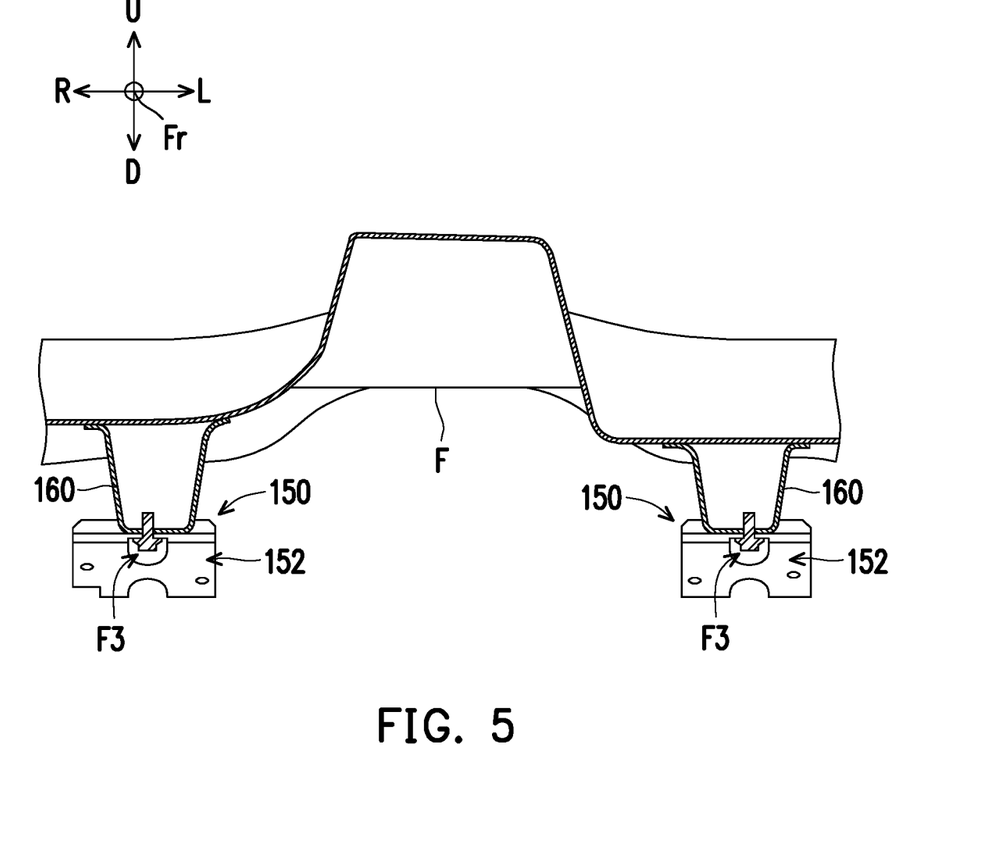
FIG. 5 is a schematic partial cross-sectional view of the vehicle front structure shown in FIG. 1 on a tangent line A-A.

FIG. 1 is a schematic bottom view of a vehicle front structure viewed from below to above according to an embodiment of the disclosure, FIG. 2 is a schematic partial side view of the vehicle front structure shown in FIG. 1, FIG. 3 is a schematic three-dimensional view of a reinforcing frame and a block component used in the vehicle front structure shown in FIG. 1, FIG. 4 is a schematic partially enlarged view of the vehicle front structure shown in FIG. 3, and FIG. 5 is a schematic partial cross-sectional view of the vehicle front structure shown in FIG. 1 on a tangent line A-A. The specific composition of a vehicle front structure 100 of the embodiment will be described below with reference to FIG. 1 to FIG. 5, wherein a vehicle front-rear direction is, for example, a vehicle front direction Fr and a vehicle rear direction Rr in the drawings, a vehicle width direction is, for example, a vehicle left direction L and a vehicle right direction R in the drawings, and a vehicle up-down direction is, for example, a vehicle up direction U and a vehicle down direction D in the drawings, but the same are only exemplary, and the disclosure is not limited thereto and may be adjusted according to requirements.

Please refer to FIG. 1. In the embodiment, the vehicle front structure 100 refers to a structure on a front end side of a vehicle (not shown) (that is, an end part corresponding to the vehicle front direction Fr) in the vehicle front-rear direction and is, for example, disposed in an engine room on the front end side of the vehicle and correspondingly connected to a vehicle device such as a suspension component S. The vehicle front structure 100 is, for example, disposed below a floor panel F used for a vehicle body structure. The vehicle front structure 100 includes a side frame 110, a sub-frame 120, a high voltage electrical component 130, a reinforcing frame 140, and a block component 150. The side frame 110 is disposed on a side part of the vehicle (that is, a side corresponding to the vehicle left direction L and a side corresponding to the vehicle right direction R) and extends in the vehicle front-rear direction. The sub-frame 120 is installed below the side frame 110 (that is, a side corresponding to the vehicle down direction D) and supports the suspension component S. The high voltage electrical component 130 is disposed below the floor panel F and is located behind the sub-frame 120 (that is, a side corresponding to the vehicle rear direction Rr). The reinforcing frame 140 is disposed around the high voltage electrical component 130, and the block component 150 is disposed at a front end of the reinforcing frame 140 (that is, an end part corresponding to the vehicle front direction Fr). Furthermore, the block component 150 has an inclined surface 152, and the inclined surface 152 is inclined upward toward the sub-frame 120. However, the disclosure does not limit the specific position of the vehicle front structure 100 (that is, does not limit the application of the vehicle front structure 100 in the vehicle) and does not limit the specific structure of a vehicle 50 to which the vehicle front structure 100 is applied, which may be adjusted according to requirements.

Specifically, in the embodiment, as shown in FIG. 1, the floor panel F is, for example, a plate with an unshown concave-convex structure to form a bottom part of the vehicle body structure. The side frame 110 is, for example, a pair of left and right hollow frame strips disposed below the floor panel F and extending in the vehicle front-rear direction to form a side part of the vehicle front structure 100 and be located on two opposite outer sides of the vehicle front structure 100 in the vehicle width direction. The sub-frame 120 is, for example, a plate with an unshown concave-convex structure and is installed below the side frame 110. The sub-frame 120 is connected to a lower portion of the suspension component S (for example, a lower arm of the suspension component S shown in FIG. 1), so as to support the suspension component S. The high voltage electrical component 130 is, for example, a battery module (which is not limited to a single element, but may also be a combination of multiple elements as shown in FIG. 1) disposed below the floor panel F via an unshown installation structure, so as to be fixed at a position closer to the rear than the sub-frame 120. However, the disclosure does not limit the specific structures and installation means of the side frame 110, the sub-frame 120, and the high voltage electrical component 130, which may be adjusted according to requirements.

Moreover, in the embodiment, as shown in FIG. 1 and FIG. 2, the reinforcing frame 140 is, for example, a frame surrounding the high voltage electrical component 130, and the block component 150 is, for example, a pair of blocks disposed at the front end of the reinforcing frame 140 and aligned in the vehicle width direction. The pair of block components 150 is, for example, fixed at the front end of the reinforcing frame 140 via a fastener as described later. However, in other unshown embodiments, the disclosure does not exclude integrally forming the reinforcing frame 140 and the block component 150, and does not exclude forming the block component 150 as a single strip-shaped block extending in the vehicle width direction. The specific implementation of the block component 150 may be adjusted according to requirements, and the disclosure is not limited thereto.

Furthermore, in the embodiment, as shown in FIG. 1 and FIG. 2, the block component 150 is disposed at a position closer to the rear than the sub-frame 120 (that is, on the side corresponding to the vehicle rear direction Rr), and the inclined surface 152 of the block component 150 and a rear end part of the sub-frame 120 (that is, an end part close to the vehicle rear direction Rr) are located at substantially the same position in the vehicle up-down direction (as shown in FIG. 2). Furthermore, the inclined surface 152 of the block component 150 faces the sub-frame 120 in front and faces upward, thereby forming an inclined surface inclined from the front to the rear and from the top to the bottom. In this way, when the vehicle collides, as shown in FIG. 2, the inclined surface 152 of the block component 150 can guide the sub-frame 120 moving rearward and contacting the inclined surface 152 downward (along the path as shown by the arrows in FIG. 2), thereby restraining the sub-frame 120 from contacting the high voltage electrical component 130 (shown in FIG. 1) located behind. In addition, the rear of the block component 150 is supported by the reinforcing frame 140 to improve the structural strength, which can restrain the block component 150 from moving rearward when contacting the sub-frame 120, so that the process of the block component 150 guiding the sub-frame 120 downward via the inclined surface 152 is more stable. Accordingly, the vehicle front structure 100 can improve the structural strength to protect the high voltage electrical component 130 and improve the collision safety performance.

In detail, in the embodiment, as shown in FIG. 1 and FIG. 3, the reinforcing frame 140 has a connection portion 142, an outer peripheral portion 144, and a front-rear extending portion 146. The connection portion 142 is connected to the block component 150, the outer peripheral portion 144 surrounds the high voltage electrical component 130, and the front-rear extending portion 146 extends rearward from the connection portion 142 (that is, the side corresponding to the vehicle rear direction Rr) and is connected to the outer peripheral portion 144. Furthermore, as shown in FIG. 3 and FIG. 4, the reinforcing frame 140 is composed of a tubular frame and is provided with a first fastening portion F1 fastened onto the block component 150 in the vehicle width direction. In this way, the connection portion 142 and the outer peripheral portion 144 are connected to each other to form a substantially quadrilateral frame structure, thereby surrounding the high voltage electrical component 130 and disposing the block component 150 at the front end. In addition, the front-rear extending portion 146 extending rearward from the connection portion 142 and connected to the outer peripheral portion 144 can increase the structural strength of the reinforcing frame 140 substantially forming the quadrilateral to restrain deformation of the reinforcing frame 140 during a collision, thereby more effectively restraining the rearward movement of the block component 150 when contacting the sub-frame 120, so as to improve the overall structural strength of the vehicle front structure 100. However, the disclosure does not limit the specific structure of the reinforcing frame 140, which may be adjusted according to requirements.

Moreover, in the embodiment, as shown in FIG. 1 and FIG. 3, the connection portion 142 is, for example, a transverse pipe substantially extending in the vehicle width direction, and the outer peripheral portion 144 is, for example, composed of a pair of longitudinal pipes substantially extending in the vehicle front-rear direction and a transverse pipe substantially extending in the vehicle width direction connected to each other. In the case where the pair of block components 150 is disposed (that is, the embodiment), the connection portion 142 is disposed between the pair of block components 150, and the pair of longitudinal tubes of the outer peripheral portion 144 are correspondingly connected to the pair of block components 150. Correspondingly, in the case where the single strip-shaped block component is disposed (an unshown embodiment), the connection portion 142 may be disposed behind the single strip-shaped block component and is connected to at least two opposite sides in the vehicle width direction, and the outer peripheral portion 144 may be connected to two opposite side surfaces (as described later) of the single strip-shaped block component in the vehicle width direction. Furthermore, the front-rear extending portion 146 is, for example, a pair of longitudinal pipes substantially extending in the vehicle front-rear direction. The connection portion 142, the outer peripheral portion 144, and the front-rear extending portion 146 may be fixedly connected (for example, welded) to each other to form the reinforcing frame 140 after being separately manufactured and may also be integrally manufactured, and the front end of the reinforcing frame 140 after manufacturing is provided with an area (for example, an opening) for fastening onto the block component 150, but the disclosure is not limited thereto. However, the disclosure does not limit the specific structure of the block component 150, which may be adjusted according to requirements.

In addition, in the embodiment, as shown in FIG. 3 and FIG. 4, in the case where the pair of block components 150 is disposed (that is, the embodiment), two end parts of the connection portion 142 in the vehicle width direction are respectively provided with the first fastening portion F1, and the first fastening portion F1 is fastened onto an inner side surface 154 of an inner side of the pair of block components 150 facing the vehicle width direction with fasteners (for example, bolts), etc. along the vehicle width direction. Front ends of the pair of longitudinal tubes of the outer peripheral portion 144A are respectively provided the first fastening portion F1, and the first fastening portion F1 is fastened onto an outer side surface 156 of an outer side of the pair of block components 150 facing the vehicle width direction with fasteners (for example, bolts), etc. along the vehicle width direction. Correspondingly, in the case where the single strip-shaped block component is disposed (an unshown embodiment), the rear side of the single strip-shaped block component may also be provided with a concave structure or a protruding structure to form a portion similar to the inner side surface, so that the first fastening portion F1 of the connection portion 142 can be fastened onto a portion of the single strip-shaped block component similar to the inner side surface 154 along the vehicle width direction, and the first fastening portion F1 of the outer peripheral portion 144 can be fastened onto the outer side surface 156 of the single strip-shaped block component along the vehicle width direction. However, the disclosure does not limit the connection means between the reinforcing frame 140 and the block component 150 (that is, does not limit whether the first fastening portion F1 is disposed), which may be adjusted according to requirements.

It can be seen that in the embodiment, the reinforcing frame 140 composed of a tubular frame with high rigidity can improve the structural strength of the reinforcing frame 140. Furthermore, fastening the reinforcing frame 140 onto the block component 150 along the vehicle width direction can increase the connection strength between the reinforcing frame 140 and the block component 150. In this way, the reinforcing frame 140 can more effectively support the block component 150 to restrain the block component 150 from moving rearward when contacting the sub-frame 120, so that the process of the block component 150 guiding the sub-frame 120 downward via the inclined surface 152 is more stable. In addition, the first fastening portion F1 of the reinforcing frame 140 is fastened onto the inner side surface 154 and the outer side surface 156 of the block component 150 along the vehicle width direction, so that the fastening structure between the reinforcing frame 140 and the block component 150 (that is, the fasteners disposed at the first fastening portion F1) does not affect the guiding path used by the inclined surface 152 to guide the sub-frame 120 moving rearward, and the length and the number of fasteners disposed on the first fastening portion F1 can be ensured, so as to ensure the connection strength between the reinforcing frame 140 and the block component 150.

Furthermore, in the embodiment, as shown in FIG. 3 and FIG. 4, the connection portion 142 extends in the vehicle width direction and is connected to the block component 150 (for example, as described above, the first fastening portions F1 disposed at the two end parts in the vehicle width direction are fastened onto the inner side surface 154 of the block component 150), and at least part of the connection portion 142 is bent to form a bent portion 142a. Furthermore, two outer end parts of the connection portion 142 in the length direction (that is, the vehicle width direction) form a pair of bent portions 142a. The pair of bent portions 142a is adjacent to the first fastening portion F1, but not limited thereto. In addition, the connection portion 142 further has a straight portion 142b connected between the pair of bent portions 142a. The front-rear extending portion 146 is connected to the straight portion 142b of the inner side of the connection portion 142 closer to the vehicle width direction than the bent portion 142a and extends rearward from the straight portion 142b of the connection portion 142 to be connected to the outer peripheral portion 144. However, the disclosure does not limit the formation position of the bent portion on the connection portion 142 and whether the bent portion is formed, which may be adjusted according to requirements.

As an exemplary assembly manner, in the embodiment, as shown in FIG. 3 and FIG. 4, in the case where the pair of block components 150 is disposed (that is, the embodiment), after installing the pair of block components 150 in the area (for example, the opening) disposed at the front end of the manufactured reinforcing frame 140, it is preferable to first fasten the first fastening portion F1 disposed on the outer peripheral portion 144 onto the outer side surface 156 of the pair of block components 150 in the vehicle width direction with fasteners (for example, bolts), and then fasten the first fastening portion F1 disposed on the connection portion 142 onto the inner side surface 154 of the pair of block components 150 in the vehicle width direction with fasteners (for example, bolts). During this process, since the outer peripheral portion 144 is fastened onto the outer side surface 156 of the pair of block components 150, when the connection portion 142 is fastened onto the inner side surface 154 of the pair of block components 150, a gap may be generated between one of the end parts of the connection portion 142 and the inner side surface 154 of the corresponding block component 150, such that a force needs to be applied to the end part to stretch and fasten the first fastening portion F1 disposed on the end part onto the inner side surface 154 of the corresponding block component 150. After the connection portion 142 is fastened onto the inner side surface 154 of the pair of block components 150, the end part may have residual stress due to stretching and fastening.

It can be seen that in the embodiment, since at least part of the connection portion 142 is bent to form the bent portion 142a, the connection portion 142 can be deformed in the length direction, and the torque when the connection portion 142 is connected to the block component 150 can be eased. In particular, forming the bent portion 142a at the two outer end parts of the connection portion 142 in the length direction to be adjacent to the first fastening portion F1 can restrain deformation of the connection portion 142 due to the residual stress generated by the torque when the first fastening portion F1 is fastened onto the block component 150 (such as being fastened onto the inner side surface 154 of the block component 150), thereby preventing the connection portion 142 from breaking due to strength reduction or aging over time. Furthermore, in the case where the sub-frame 120 moving rearward contacts the inclined surface 152 and applies a collision load to the block component 150, the collision load of the block component 150 can be effectively transmitted to the front-rear extending portion 146 connected to the straight portion 142b of the inner side of the connection portion 142 closer to the vehicle width direction than the bent portion 142a, thereby restraining deformation of the reinforcing frame 140 during a collision. That is, the reinforcing frame 140 can effectively support the block component 150, thereby restraining the rearward movement of the block component 150 when contacting the sub-frame 120, so as to reliably guide the sub-frame 120 downward.

In addition, in the embodiment, as shown in FIG. 1 and FIG. 2, the sub-frame 120 has an extension portion 122 extending rearward, and the block component 150 is aligned with the extension portion 122 in the vehicle front-rear direction. In the case where the pair of block components 150 is disposed (that is, the embodiment), the rear end part of the sub-frame 120 is provided with a pair of extension portions 122 extending rearward, and the pair of extension portions 122 substantially corresponds to the pair of block components 150 in the vehicle width direction, so as to be aligned in the vehicle front-rear direction. Correspondingly, in the case where the single strip-shaped block component is disposed (an unshown embodiment), the rear end part of the sub-frame 120 may be provided with a single extension portion 122 or a pair of extension portions 122 extending rearward, as long as the extension portion 122 may substantially correspond to the inclined surface of the single strip-shaped block component in the vehicle width direction. In this way, when the vehicle collides, the sub-frame 120 moving rearward can first contact the inclined surface 152 (as shown in FIG. 2) of the block component 150 with the extension portion 122 at the initial stage of the rearward movement, so that the block component 150 and the extension portion 122 aligned in the vehicle front-rear direction can reliably guide the sub-frame 120 downward, thereby restraining the sub-frame 120 from contacting the high voltage electrical component 130 located behind. However, the disclosure does not limit the number and the configuration position of the extension portion 122 and whether the extension portion 122 is disposed, which may be adjusted according to requirements.

In addition, in the embodiment, as shown in FIG. 3 and FIG. 4, the inclined surface 152 of the block component 150a is provided with a pair of second fastening portions F2 separately disposed in the vehicle width direction. The pair of second fastening portions F2 protrudes further downward than the inclined surface 152 (that is, the side corresponding to the vehicle down direction D). Furthermore, as shown in FIG. 1, a pitch P between the pair of second fastening portions F2 is wider than a width W of the extension portion 122, and the extension portion 122 corresponds to between the pair of second fastening portions F2 in the vehicle width direction. The second fastening portion F2 is, for example, a protruding structure fastened onto the inclined surface 152 of the block component 150 with fasteners (for example, bolts), so that a corresponding channel for the extension portion 122 to pass through can be formed between the pair of second fastening portions F2. In the case where the pair of block components 150 is disposed (that is, the embodiment), the inclined surfaces 152 of the pair of block components 150 are respectively provided with the pair of second fastening portions F2 separately disposed in the vehicle width direction, that is, the pair of extension portions 122 respectively correspond to the pair of second fastening portions F2 disposed on the inclined surface 152 of the corresponding block component 150. Correspondingly, in the case where the single strip-shaped block component is disposed (an unshown embodiment), a corresponding number of pairs of second fastening portions F2 may be disposed on the inclined surface 152 of the single block component according to the number of the extension portions 122. However, the disclosure does not limit the number and the configuration position of the second fastening portion F2 and whether the second fastening portion F2 is disposed, which may be adjusted according to requirements.

In this way, in the case where the sub-frame 120 moving rearward contacts the inclined surface 152 of the block component 150 with the extension portion 122, the extension portion 122 moves along the inclined surface 152 through the channel between the corresponding pair of second fastening portions F2. Two opposite ends of the extension portion 122 in the vehicle width direction are restricted by the pair of second fastening portions F2 protruding downward, so the block component 150 can reliably guide the sub-frame 120 downward, thereby restraining the sub-frame 120 from contacting the high voltage electrical component 130 located behind. Furthermore, since the structure such as the fastener as the second fastening portion F2 does not affect the path of the sub-frame 120 moving downward, a cover component (not shown), etc. may be disposed below the inclined surface 152 of the block component 150 through the second fastening portion F2 on the block component 150 to prevent the sub-frame 120 moving downward from breaking and to improve air circulation in the lower space of the vehicle. However, the disclosure does not limit the use of the second fastening portion F2, that is, does not limit whether the cover component is disposed, which may be adjusted according to requirements.

Furthermore, in the embodiments described above, compared to the manner of disposing the single block component, the manner of disposing the pair of block components 150 may be regarded as disposing the pair of block components 150 with the inclined surfaces 152 only at positions of the sub-frame 120 moving rearward and contacting the block component 150 (that is, positions corresponding to the pair of extension portions 122), which can save the configuration space required by the block component 150 and facilitate the spatial layout of other components. Similarly, in the case where the sub-frame 120 is only provided with the single extension portion 122 extending rearward, the single block component 150 aligned with the single extension portion 122 in the vehicle front-rear direction may also be disposed only at the front end of the reinforcing frame 140. In the case where the sub-frame 120 is provided with three or more extension portions 122 extending rearward, three or more separated block components 150 aligned with the three or more extension portions 122 in the vehicle front-rear direction may also be disposed at the front end of the reinforcing frame 140. The single strip-shaped block component does not need to be disposed corresponding to the size of the sub-frame 120 in the vehicle width direction. However, the disclosure is not limited thereto and may be adjusted according to requirements.

In addition, in the embodiment, as shown in FIG. 1 and FIG. 5, the vehicle front structure 100 further includes a floor frame 160. The floor frame 160 is installed on the floor panel F to form a closed cross-section with the floor panel F (as shown in the cross-section of FIG. 5) and extends in the vehicle front-rear direction. Furthermore, the floor frame 160 is, for example, a pair of left and right hollow frame strips installed below the floor panel F and extending in the vehicle front-rear direction, so as to be connected to a lower surface of the floor panel F (that is, a surface corresponding to the vehicle down direction D) and form the closed cross-section, and the pair of floor frames 160 are disposed on inner sides of a pair of side frames 110 in the vehicle width direction. Moreover, the block component 150 is not only disposed at the front end of the reinforcing frame 140, but further installed on the floor frame 160. For example, as shown in FIG. 4 and FIG. 5, the block component 150 is also provided with a third fastening portion F3. The third fastening portion F3 is disposed to be recessed inward from the inclined surface 152, so as not to affect the process of the inclined surface 152 guiding the sub-frame 120 moving rearward and contacting the inclined surface 152 downward. Also, the block component 150 can be fastened onto the lower surface of the floor panel F with fasteners (for example, bolts), etc. at the third fastening portion F3.

It can be seen that in the embodiment, in the case where the inclined surface 152 of the block component 150 guides the sub-frame 120 moving rearward and contacting the inclined surface 152 downward, the load borne by the block component 150 when the sub-frame 120 contacts the inclined surface 152 can be transmitted not only to the reinforcing frame 140, but also to the highly rigid floor frame 160 forming the closed cross-section, thereby preventing the reinforcing frame 140 from damaging during a collision. Moreover, since the floor frame 160 can distribute the load borne by the block component 150 toward the vehicle front-rear direction, the block component 150 can more firmly bear the load of the sub-frame 120 moving rearward and more reliably guide the sub-frame 120 moving rearward downward. However, the disclosure does not limit the connection manner between the floor frame 160 and the block component 150, nor does the disclosure limit the specific structure of the floor frame 160 and whether the floor frame 160 is disposed, which may be adjusted according to requirements.

In summary, in the vehicle front structure of the disclosure, the sub-frame is installed below the side frame, the high voltage electrical component is located behind the sub-frame, the reinforcing frame is disposed around the high voltage electrical component, and the block component is disposed at the front end of the reinforcing frame. The block component has the inclined surface, and the inclined surface is inclined upward toward the sub-frame. In this way, when the vehicle collides, the inclined surface of the block component can guide the sub-frame moving rearward and contacting the inclined surface downward, thereby restraining the sub-frame from contacting the high voltage electrical component located behind. In addition, the rear of the block component is supported by the reinforcing frame to improve the structural strength, which can restrain the block component from moving rearward when contacting the sub-frame, so that the process of the block component guiding the sub-frame downward via the inclined surface is more stable.

Preferably, the reinforcing frame has the connection portion connected to the block component, the outer peripheral portion surrounding the high voltage electrical component, and the front-rear extending portion extending rearward from the connection portion and connected to the outer peripheral portion, and the block component is further installed on the floor frame, so as to further improve the structural strength of the block component and the reinforcing frame. Accordingly, the vehicle front structure of the disclosure can improve the structural strength to protect the high voltage electrical component and improve the collision safety performance.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle front structure, comprising:
    a side frame, disposed on a side part of a vehicle and extending in a vehicle front-rear direction;
    a sub-frame, installed below the side frame and supporting a suspension component;
    a high voltage electrical component, disposed below a floor panel and located behind the sub-frame;
    a reinforcing frame, disposed around the high voltage electrical component; and
    a block component, disposed at a front end of the reinforcing frame, wherein
    the block component has an inclined surface, and the inclined surface is inclined upward toward the sub-frame.

2. The vehicle front structure according to claim 1, wherein:
    the sub-frame has an extension portion extending rearward,
    the block component is aligned with the extension portion in the vehicle front-rear direction.

3. The vehicle front structure according to claim 2, wherein:
    the reinforcing frame is composed of a tubular frame and is provided with a first fastening portion fastened onto the block component in a vehicle width direction.

4. The vehicle front structure according to claim 3, wherein:
    the inclined surface of the block component is provided with a pair of second fastening portions separately disposed in the vehicle width direction,
    the pair of second fastening portions protrudes further downward than the inclined surface,
    a pitch between the pair of second fastening portions is wider than a width of the extension portion, and the extension portion corresponds to between the pair of second fastening portions in the vehicle width direction.

5. The vehicle front structure according to claim 1, wherein:
    the reinforcing frame has a connection portion, an outer peripheral portion, and a front-rear extending portion,
    the connection portion is connected to the block component,
    the outer peripheral portion surrounds the high voltage electrical component, and
    the front-rear extending portion extends rearward from the connection portion and is connected to the outer peripheral portion.

6. The vehicle front structure according to claim 2, wherein:
    the reinforcing frame has a connection portion, an outer peripheral portion, and a front-rear extending portion,
    the connection portion is connected to the block component,
    the outer peripheral portion surrounds the high voltage electrical component, and
    the front-rear extending portion extends rearward from the connection portion and is connected to the outer peripheral portion.

7. The vehicle front structure according to claim 3, wherein:
    the reinforcing frame has a connection portion, an outer peripheral portion, and a front-rear extending portion,
    the connection portion is connected to the block component,
    the outer peripheral portion surrounds the high voltage electrical component, and
    the front-rear extending portion extends rearward from the connection portion and is connected to the outer peripheral portion.

8. The vehicle front structure according to claim 4, wherein:
    the reinforcing frame has a connection portion, an outer peripheral portion, and a front-rear extending portion,
    the connection portion is connected to the block component,
    the outer peripheral portion surrounds the high voltage electrical component, and
    the front-rear extending portion extends rearward from the connection portion and is connected to the outer peripheral portion.

9. The vehicle front structure according to claim 5, wherein:
    the connection portion extends in a vehicle width direction to be connected to the block component, and
    at least part of the connection portion is bent to form a bent portion.

10. The vehicle front structure according to claim 6, wherein:
    the connection portion extends in a vehicle width direction to be connected to the block component, and
    at least part of the connection portion is bent to form a bent portion.

11. The vehicle front structure according to claim 7, wherein:
    the connection portion extends in the vehicle width direction to be connected to the block component, and
    at least part of the connection portion is bent to form a bent portion.

12. The vehicle front structure according to claim 8, wherein:
    the connection portion extends in the vehicle width direction to be connected to the block component, and
    at least part of the connection portion is bent to form a bent portion.

13. The vehicle front structure according to claim 9, wherein:
    two outer end parts of the connection portion in a length direction form a pair of the bent portions, the connection portion further has a straight portion connected between the pair of the bent portions, the front-rear extending portion is connected to the straight portion of an inner side of the connection portion closer to the vehicle width direction than the bent portion.

14. The vehicle front structure according to claim 10, wherein:

two outer end parts of the connection portion in a length direction form a pair of the bent portions, the connection portion further has a straight portion connected between the pair of the bent portions, the front-rear extending portion is connected to the straight portion of an inner side of the connection portion closer to the vehicle width direction than the bent portion.

15. The vehicle front structure according to claim 11, wherein:

two outer end parts of the connection portion in a length direction form a pair of the bent portions, the connection portion further has a straight portion connected between the pair of the bent portions, the front-rear extending portion is connected to the straight portion of an inner side of the connection portion closer to the vehicle width direction than the bent portion.

16. The vehicle front structure according to claim 12, wherein:

two outer end parts of the connection portion in a length direction form a pair of the bent portions, the connection portion further has a straight portion connected between the pair of the bent portions, the front-rear extending portion is connected to the straight portion of an inner side of the connection portion closer to the vehicle width direction than the bent portion.

17. The vehicle front structure according to claim 1, further comprising:

a floor frame, installed to the floor panel to form a closed cross-section with the floor panel and extending in the vehicle front-rear direction, wherein the block component is further installed on the floor frame.

18. The vehicle front structure according to claim 2, further comprising:

a floor frame, installed to the floor panel to form a closed cross-section with the floor panel and extending in the vehicle front-rear direction, wherein the block component is further installed on the floor frame.

19. The vehicle front structure according to claim 3, further comprising:

a floor frame, installed to the floor panel to form a closed cross-section with the floor panel and extending in the vehicle front-rear direction, wherein the block component is further installed on the floor frame.

20. The vehicle front structure according to claim 4, further comprising:

a floor frame, installed to the floor panel to form a closed cross-section with the floor panel and extending in the vehicle front-rear direction, wherein the block component is further installed on the floor frame.

* * * * *